(12) United States Patent
Chen et al.

(10) Patent No.: US 10,574,409 B2
(45) Date of Patent: Feb. 25, 2020

(54) INFORMATION NOTIFICATION METHOD AND CHANNEL STATE INFORMATION PROCESS EXECUTION METHOD

(71) Applicant: ZTE CORPORATION, Shenzhen (CN)

(72) Inventors: Yijian Chen, Shenzhen (CN); Yu Ngok Li, Shenzhen (CN); Huahua Xiao, Shenzhen (CN); Zhaohua Lu, Shenzhen (CN); Jianxing Cai, Shenzhen (CN); Yong Li, Shenzhen (CN); Hao Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/763,293

(22) PCT Filed: Aug. 24, 2016

(86) PCT No.: PCT/CN2016/096561
§ 371 (c)(1),
(2) Date: Mar. 26, 2018

(87) PCT Pub. No.: WO2017/050084
PCT Pub. Date: Mar. 30, 2017

(65) Prior Publication Data
US 2018/0287749 A1    Oct. 4, 2018

(30) Foreign Application Priority Data
Sep. 25, 2015   (CN) .......................... 2015 1 0626158

(51) Int. Cl.
*H04L 1/20*    (2006.01)
*H04L 1/06*    (2006.01)
*H04B 17/24*    (2015.01)
*H04B 17/309*    (2015.01)
*H04B 7/06*    (2006.01)
(Continued)

(52) U.S. Cl.
CPC ............. *H04L 1/20* (2013.01); *H04B 7/0456* (2013.01); *H04B 7/0645* (2013.01); *H04B 17/24* (2015.01); *H04B 17/309* (2015.01); *H04L 1/06* (2013.01); *H04L 5/0053* (2013.01); *H04W 24/10* (2013.01); *H04L 1/0026* (2013.01)

(58) Field of Classification Search
None
See application file for complete search history.

(56) References Cited

U.S. PATENT DOCUMENTS

2013/0223253 A1*  8/2013  Enescu ................. H04W 24/02
                                                        370/252
2015/0071368 A1   3/2015  Lau et al.
(Continued)

FOREIGN PATENT DOCUMENTS

CN         103516464 A      1/2014

*Primary Examiner* — Diane L Lo
(74) *Attorney, Agent, or Firm* — Li & Cai Intellectual Property (USA) Office

(57) ABSTRACT

An information notification method, comprising: obtaining a plurality of parameter sets, the parameter sets comprising one or more types of CSI parameter used for indicating a channel state information (CSI) measurement and/or feedback; sending a parameter set within the plurality of parameter sets which corresponds to a CSI process to a terminal.

13 Claims, 6 Drawing Sheets

--- acquire a plurality of parameter sets, wherein the parameter set includes one or more categories of CSI parameters for indicating CSI measurement and/or feedback — S202 send a parameter set corresponding to the CSI process in the plurality of parameter sets to the terminal — S204

(51) Int. Cl.
*H04B 7/0456* (2017.01)
*H04L 5/00* (2006.01)
*H04W 24/10* (2009.01)
*H04L 1/00* (2006.01)

(56) References Cited

U.S. PATENT DOCUMENTS

2015/0117380 A1* 4/2015 Zhang .................. H04W 24/10
370/329
2016/0330011 A1* 11/2016 Lee ....................... H04L 5/0066

* cited by examiner

INFORMATION NOTIFICATION METHOD AND CHANNEL STATE INFORMATION PROCESS EXECUTION METHOD

CROSS REFERENCE

The present application is a continuing application of International Application No. PCT/CN2016/096561, filed on Aug. 24, 2016, which is based upon and claims priority to Chinese Patent Application No. 201510626158.4, filed on Sep. 25, 2015, and the entire contents thereof are incorporated herein by reference.

TECHNICAL FIELD

The present application relates to but not limited to the field of communication, and in particular, to an information notification method and a method for performing a channel state information (CSI) process.

BACKGROUND

In a wireless communication system, the transmitter and the receiver generally use multiple antennas to transmit and receive to obtain a higher rate. One principle of multi-antenna technology is to, based on the characteristics of the channel, form multi-layer transmission that matches some characteristics of the channel. The radiation direction of the signal is very targeted, can effectively improve the system performance, and obtain significant performance improvement without increasing the bandwidth and power. The performance improvement is a very promising technology that is widely used in the current system. The data transmission performance of a multi-antenna system mainly depends on the measurement and feedback of channel state information (CSI). Therefore, the measurement and feedback of CSI is the core content of multi-antenna technology. How to guarantee the accuracy, and the cost and robustness of the channel measurement and CSI feedback becomes an important issue.

The measurement and feedback of CSI is relatively simple to design in the early version of LTE (Long Term Evolution) system, but as precision requirements become higher and higher, while it is not desirable to have significant pilot overhead, feedback overhead, and quantization complexity. As a result, CSI measurement and feedback technologies have become more and more complex to pursue higher quantization efficiency. In addition, due to the need for adaptability to various scenarios and antenna configurations, a large number of new solutions have also been introduced. Here are some basic content related to CSI quantization feedback:

1. CSI (RI/PMI/CQI) Feedback Content

The channel state information includes: channel quality indication (abbreviated as CQI), precoding matrix indicator (abbreviated as PMI), and rank indicator (abbreviated as RI). CQI is an indicator of measuring the quality of the downlink channel. In the 36-213 protocol, the CQI is represented by an integer value of 0 to 15, which respectively represents different CQI levels. Different CQIs correspond to their respective modulation schemes and code rates (MCS). RI is used to describe the number of spatially independent channels, corresponding to the rank of the channel response matrix. In the open-loop spatial multiplexing and closed-loop spatial multiplexing modes, the UE (User Equipment, user equipment or terminal) needs to feed back RI information, and there is no need to feed back RI information in other modes. The rank of the channel matrix corresponds to the number of layers. The PMI feedback is the best precoding information, based on the index feedback, indicating the codeword of the agreed codebook that most closely matches the characteristics of the current channel. The standard supports configuration of a codebook used by each UE through a Codebook Subset Restriction function.

2. CSI Feedback

The feedback of the terminal CSI mainly exists in two ways: the base station may configure the terminal to measure and quantize the CSI, and perform periodical feedback on the quantized CSI information (including RI/PMI/CQI) through an uplink control channel (PUCCH). The base station can also suddenly trigger the terminal to report CSI information (including RI/PMI/CQI) non-periodically when needed, so as to overcome problems that the real-time performance of the periodic feedback is not high enough, and the CSI quantization accuracy is limited to the overhead of the control channel.

3. CSI Process

The 3rd Generation Partnership Project (3GPP) also introduces the concept of CSI process. The base station can configure a plurality of CSI processes for the terminal. Each CSI process is equivalent to a CSI measurement and feedback process, and each CSI process is independent to other CSI process and can configure CSI parameters separately. In the transmission mode 9, one process is supported; in the transmission mode 10, up to four processes can be supported. The configuration of the channel measurement section, the interference measurement section, and the feedback mode are defined in the configuration of each CSI process. The interference measurement section may be a single interference measurement configuration csi-IM-ConfigId, or may be an interference measurement list configuration csi-IM-ConfigIdList. The latter is mainly used when TDD (Time Division Duplexing) supports eIMTA. The configuration of the CSI process may also include some other configuration information, such as pilot power Pc information, bitmap indication information of a Codebook Subset Restriction, indication information selected by a 4Tx codebook version, and the like.

4. Channel Measurement Resources and Interference Measurement Resources

The channel measurement section generally specifies a set of non-zero power CSI measurement pilots (Non Zero Power CSI-RS) for channel measurement, and the interference measurement section generally specifies a set of IMR resource configuration or resource configuration list for interference measurement. The IMR resources generally can be a set of Zero Power CSI-RS or Zero Power CSI-RS list.

5. Feedback Categories

There are two categories of CSI measurement and feedback: Class A and Class B respectively.

Class A: The base station transmits the CSI-RS, which is generally a non-precoding pilot. The UE directly performs channel measurement and CSI quantization based on the CSI-RS pilot to obtain an RI/PMI/CQI. These contents are fed back on the PUCCH or PUSCH, and the feedback contents include, among others, the wideband beam direction.

Class B: The CSI-RS sent by the base station is generally a precoding pilot, and the UE may need to perform precoding pilot selection first, or pre-encode pilot resource set selection, or port group selection, and then the CSI quantization feedback is performed based on the selected subset, including subset selection information, and RI/PMI/CQI information corresponding to the selected CSI-RS measurement resource subset.

6. Introduction on Codebook Feedback

The basic principle of codebook-based CSI quantization feedback is briefly described as follows. Assuming that the limited feedback channel capacity is B bps/Hz, the number of available codewords is $N=2^B$. The feature vector space of the channel matrix is quantized to form the codebook space $\Re = \{F_1, F_2 \Lambda F_N\}$. The transmitter and the receiver both save or generate this codebook in real time $\Re$ (for both of the transmitter and the receiver). To implement H for each channel, the receiver selects a codeword $\hat{F}$ that most closely matches the channel implementation H from the codebook space $\Re$ according to certain criteria and feeds back back the sequence number i (codeword number) of the codeword $\hat{F}$ to the transmitter. Here, the codeword number is referred to as a precoding matrix indicator (abbreviated as PMI) in the codebook. The transmitter finds the corresponding precoded codeword $\hat{F}$ according to this sequence number i to obtain the corresponding CSI, and $\hat{F}$ represents the feature vector information of the channel. Here, the channel implementation H is generally obtained by channel measurement based on channel measurement pilots.

In general, the codebook space $\Re$ can be further divided into multiple codebooks corresponding to Ranks, and each Rank corresponds to multiple codewords to quantize the precoding matrix formed by the channel feature vectors under the Rank. Since the number of Ranks and non-zero feature vectors of the channel is equal, generally, when the Rank is N, the codeword will have N columns. Therefore, the codebook space $\Re$ can be divided into multiple sub-codebooks according to the Rank, as shown in Table 1.

TABLE 1 codebook divided into sub-codebooks by Rank
$\Re$
layers v (Rank)

| 1 | 2 | ... | N |
|---|---|---|---|
| $\Re_1$ | $\Re_2$ | ... | $\Re_N$ |
| codewords vector set of 1 column | codewords vector set of 2 columns | ... | codewords vector set of N columns |

When Rank>1, the codewords that need to be stored are all in the form of a matrix, and the codebook in the LTE protocol is the feedback method used in this codebook quantization. The LTE downlink 4 transmits the antenna codebook, and actually the meaning of the precoding codebook and the channel state information quantization codebook in LTE is the same. In the following, for the sake of consistency, the vector can also be seen as a matrix with 1 dimension. There may be multiple sets of codebooks for selection to perform quantization with different accuracies and in different scenarios.

7. Introduction on Codebook Subset Restriction and Selection Configuration Signaling Codebook subset restriction (abbreviated as CSR) is a kind of codebook configuration signaling, which can also be called Codebook Subset Selection. It refers to restricting a UE's codeword set to a subset of a large codebook set. In this way, codebook subsets suitable for the UE or codebook subsets that reduce interference to other UEs may be selected according to the channel characteristics of the UE, which can reduce the codebook selection complexity of the UE, reduce the overhead of the codebook feedback, and limit the beam direction of the UE. This method has obvious advantages for FD codebooks since FD-MIMO has a large number of antennas, codebooks with different numbers of antennas, codebooks with different antenna topologies. If one codebook is designed for each of the different numbers of antennas and for each of the different antenna topologies, the set of codebooks will be very huge. On the other hand, a large codebook set may be designed for the CSR, and then, based on the antenna number and topology of the base station as well as the UE's channel characteristics, one codebook set is given to the UE. In this way, the feedback overhead and the complexity for the UE searching codeword can be reduced.

8. Feedback Mode

The feedback mode refers to an instruction combination of CSI (CQI/PMI/RI) feedback, including subband feedback and wideband feedback or selecting M subband feedbacks, and including periodic feedback and non-periodic feedback. The non-periodic feedback is transmitted in the PUSCH, including the modes shown in Table 2:

TABLE 2

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

The periodic feedback mode refers to the mode of feedback in the PUCCH periodically, which includes the modes shown in Table 3:

TABLE 3

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

9. RI/PMI Disabling

Channel rank indication disabling (abbreviated as RI disabling) refers to whether to report the rank of the MIMO channel when the UE reports a CSI in a multiple input multiple output system. In the scenario of using the uplink channel reciprocity to obtain the downlink channel, such as open loop spatial multiplexing, spatial subset, or TDD, the UE does not need to feed back RI, and thus RI disabling can be enabled, thereby saving feedback overhead.

Precoding matrix indicator disabling (PMI disabling) refers to whether to report the precoding index of the MIMO when the UE reports a CSI in a multiple input multiple output system. In the scenario of using the uplink channel reciprocity to obtain the downlink channel, such as open loop spatial multiplexing, spatial subset, or TDD, the UE does not need to feed back PMI, and thus PMI disabling can be enabled, thereby saving feedback overhead.

10. Introduction on Feedback Dimension

The quantized CSI dimension of the feedback has several situations. For example, the base station configures K sets of pilots in a CSI process, each set of pilots corresponds to a number Nk of CSI-RS resource sets, and the PMI in the CSI has a dimension L (the number of rows of the vector or matrix) may be equal to the total number of ports of a set of CSI-RS configurations: L=sum(Nk) for all k, or L=Nk, or L<Nk (signaling configured by the base station or determined by the UE); different feedback dimensions have different CSI quantization complexity and overhead.

11. Introduction on Measurement Limit

Measurement Restriction (MR) refers to that the UE can only perform channel measurement and joint operation in a time window or frequency domain size when performing channel measurement. These joint operations may be the average of the channel, LMMSE interpolation and so on. The time window refers to K consecutive subframes. The CSI-RS and other pilots in the K consecutive subframes have the same precoding. The frequency domain size refers to M consecutive physical resource blocks (PRBs) in the frequency domain. Here, the CSI-RSs in the PRBs have the same precoding matrix. K and M are positive integers. The MR can also be considered in the frequency domain. For example, the size of the frequency domain window of the joint operation is multiple resource block (RB) subbands and so on.

12. CSI-RS Pilot Configuration:

BFed CSI-RS may be implemented by multiple configuration methods, mainly including the following situations:

Configuring multiple sets of CSI-RS configurations. One beam can correspond to a set of CSI-RS configurations. This method is flexible, and can configure different pilot parameters (periods, number of ports, power parameters, etc.) for different configurations, but the configuration signaling overhead is large. Each CSI-RS configuration includes multiple ports. These ports generally have the same precoding, and the terminal selection beam is a selected CSI-RS configuration, as shown in FIG. 1(a).

Configuring a set of CSI-RS configurations, but including multiple resource sets. One beam can correspond to one resource set. This mode is less flexible, and cannot configure different pilot parameters (periods, number of ports, power parameters, etc.) for different configurations, but the configuration signaling overhead is small, the different resource sets correspond to different beams. The resource set can contain multiple ports, and these ports generally have the same precoding. The terminal selection beam is to select the resource set, as shown in FIG. 1(b).

Configuring a set of CSI-RS configurations as one resource set, but including a plurality of port groups. Different port groups have different corresponding beams, and a port group may include one or more ports. These ports generally have the same precoding. The terminal selecting the beam is to select the port group, as shown in FIG. 1(c).

The selection of the BFed CSI-RS generally requires feedback of a beam index, and the Beam Index is generally one or more; the latter has a larger overhead and less application scenarios.

The configuration of the non-precoding pilot may be a pilot configured with a set of total port Nt ports, including one resource set, and may also configure K pilot resource sets each having a number Nk of ports, and merge them into non-preconfigured pilots of Nt ports.

The pilot power parameter Pc refers to the ratio of the power transmitted by the CSI RS pilot to the power of the data transmitted in the same RB. The boosting value of the CSI-RS pilot with respect to the data can be known through Pc, so that the CQI on the data can be obtained by conversion when calculating the CQI.

Pilot multiplexing mode configuration: there may be multiple multiplexing modes for different pilot ports, For example, multiplexing by Code Division Multiplexing (CDM), with the orthogonal code length being 2, or multiplexing by code division multiple access CDM, with the orthogonal code length being 4.

The frequency domain position configuration sent by the pilot may be configured by multiple configurations, such as sending the RB position at full bandwidth, ½ bandwidth, even RB, base RB, or the RB where the data channel is located.

Bundling parameter of the pilot. Bundling means that the same precoded pilot (CSI-RS/DMRS) is bound with a certain frequency domain granularity or time domain window. In this frequency domain granularity, corresponding joint channel estimation or joint interference measurement estimation can be performed. The base station can configure the parameters such as bundling, bundling granularity, etc. for the pilot.

However, the related art has the following problems: a configuration method is to bind some of the above parameters with the configuration of the Process, or perform binding configuration with the CSI-RS configuration. The relationship between the above parameters and the CSI Process and CSI-RS configuration is determined during high-level configuration. One CSI Process/one set of CSI-RS configurations can only produce one relationship with the above parameters, which greatly limits the configuration flexibility, and makes a lot of flexible standard transparent technologies unable to be implemented.

This section provides background information related to the present disclosure which is not necessarily prior art.

SUMMARY

The following is a summary of the subject matters described in detail herein. This summary is not intended to limit the scope of protection of the claims.

The embodiments of the present disclosure provide an information notification method and a method for executing a channel state information (CSI) process, so as to at least solve the technical problem that the standard transparent technology in the related art cannot be implemented.

According to an aspect of the embodiments of the present disclosure, there is provided an information notification method including: determining, by a base station, M categories of parameters for indicating measurement and feedback, where M is an integer greater than or equal to 1, and the parameter categories contain at least one of: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of a transmission pilot; a configuration parameter of a measurement limit parameter; a configuration parameter of a feedback dimension parameter; and a configuration parameter of a feedback mode parameter; and performing, by the base station, joint encoding configuration for the M categories of parameters for indicating measurement and feedback, and configuring N parameter sets through higher layer signaling, where N is an integer greater than or equal to 1, and each of the parameter set at least contains a set of joint configuration parameters of the M categories of parameters for indicating measurement and feedback; and indicating simultaneously, by the base station, selection information of one or more configured parameter sets corresponding to triggering of one or more channel state information CSI processes when the base station triggers non-periodical CSI feedback through physical layer control signaling.

According to an aspect of the embodiments of the present disclosure, there is provided a method for performing a channel state information CSI process, including: receiving, by a terminal, N parameter sets of measurement and feedback configured by a base station through higher layer signaling, wherein each of the parameter sets contains one or more of M categories of parameters for indicating measurement and feedback, where N is an integer larger than or equal to 1, M is an integer larger than or equal to 1, and the parameter categories contain at least one of: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of a transmission pilot; a configuration parameter of a measurement limit parameter; a configuration parameter of a feedback dimension parameter; and a configuration parameter of a feedback mode parameter; receiving, by the terminal, selection information of configured parameter sets notified by the base station through physical layer signaling; determining, by the terminal, a correspondence relationship between the selection information and the one or more CSI processes to be measured and fed back, and a correspondence relationship between the configured parameter sets and each of the CSI processes; and applying, by the terminal, configured categories of parameters in the configured parameter sets for the measurement or feedback of the corresponding CSI process.

According to an aspect of the embodiments of the present disclosure, there is provided an information notification method including: acquiring a plurality of parameter sets, wherein each of the parameter sets includes one or more categories of CSI parameters for indicating CSI measurement and/or feedback; and sending to a terminal a parameter set corresponding to the CSI process in the plurality of parameter sets.

Optionally, sending to a terminal a parameter set corresponding to the CSI process in the plurality of parameter sets includes: sending to a terminal a parameter set corresponding to the CSI process in the plurality of parameter sets through control signaling.

Optionally, sending to a terminal a parameter set corresponding to the CSI process in the plurality of parameter sets includes: when triggering a CSI process non-periodically, sending to the terminal a parameter set corresponding to the non-periodically triggered CSI process in the plurality of parameter sets.

Optionally, triggering the CSI process non-periodically is performed by: triggering the CSI process non-periodically through physical layer control signaling.

Optionally, the CSI parameter includes at least one of: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of the transmission pilot; a configuration parameter of a measurement limit parameter; a configuration parameter of a feedback dimension parameter; and a configuration parameter of a feedback mode parameter.

Optionally, the CSI parameter also includes: a triggering indication parameter of a CSI process and/or a CSI triggering indication parameter of a serving cell.

Optionally, the method further includes: triggering joint encoding configuration of each of the plurality of parameter sets by: performing joint encoding configuration according to triggering indications of the plurality of parameter sets and a CSI process set; performing joint encoding configuration according to CSI triggering indications of the plurality of parameter sets and a serving cell set; and performing joint encoding configuration according to CSI triggering indications of the plurality of parameter sets, the serving cell set and the CSI process set.

According to an aspect of the embodiments of the present disclosure, there is provided a method for performing a channel state information CSI process, including: receiving from a base station a parameter set corresponding to a CSI process in the plurality of parameter sets, wherein each of the parameter set includes one or more categories of CSI parameters for indicating CSI measurement and/or feedback; and performing CSI measurement and/or feedback in the CSI process utilizing the one or more categories of CSI parameters configured in the parameter set corresponding to the CSI process.

Optionally, when a terminal performs a plurality CSI processes, each of the CSI processes corresponds to one parameter set in the received parameter sets.

Optionally, before performing CSI measurement and/or feedback in the CSI process using the one or more categories of CSI parameters configured in the parameter set corresponding to the CSI process, the method further includes: determining a correspondence relationship between each of the plurality CSI processes and the corresponding parameter set in the received parameter sets.

According to an aspect of the embodiments of the present disclosure, there is provided a base station for sending a notification to a terminal, including: an acquiring unit configured to acquire a plurality of parameter sets, wherein each of the parameter sets includes one or more categories of CSI parameters for indicating CSI measurement and/or feedback; and a sending unit configured to send to a terminal a parameter set corresponding to the CSI process in the plurality of parameter sets.

Optionally, the sending unit is further configured to send to a terminal a parameter set corresponding to the CSI process in the plurality of parameter sets through control signaling.

Optionally, the sending unit is further configured to, when triggering a CSI process non-periodically, send to the terminal a parameter set corresponding to the non-periodically triggered CSI process in the plurality of parameter sets.

Optionally, the base station further includes: a first triggering unit configured to trigger the CSI process non-periodically through physical layer control signaling.

Optionally, the base station further includes: a second triggering unit configured to trigger joint encoding configuration of each of the plurality of parameter sets by: performing joint encoding configuration according to triggering indications of the plurality of parameter sets and a CSI process set; performing joint encoding configuration according to CSI triggering indications of the plurality of parameter sets and a serving cell set; and performing joint encoding configuration according to CSI triggering indications of the plurality of parameter sets, the serving cell set and the CSI process set.

According to an aspect of the embodiments of the present disclosure, there is provided a terminal for performing a channel state information CSI process, including: a receiving unit configured to receive from a base station a parameter set corresponding to a channel state information CSI process in the plurality of parameter sets, wherein each of the parameter set includes one or more categories of CSI parameters for indicating CSI measurement and/or feedback; and a performing unit configured to perform CSI measurement and/or feedback in the CSI process utilizing the one or more categories of CSI parameters configured in the parameter set corresponding to the CSI process.

Optionally, when a terminal performs a plurality CSI processes, each of the CSI processes corresponds to one parameter set in the received parameter sets, and the terminal further includes: a determining unit configured to, before the performing unit performs CSI measurement and/or feedback in the CSI process using the one or more categories of CSI parameters configured in the parameter set corresponding to the CSI process, determine a correspondence relationship between each of the plurality CSI processes and the corresponding parameter set in the received parameter sets.

According to an aspect of the embodiments of the present disclosure, there is provided a base station for sending a notification to a terminal, including: a first determining module configured to determine M categories of parameters for indicating measurement and feedback, where M is an integer greater than or equal to 1, and the parameter categories contain at least one of: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of a transmission pilot; a configuration parameter of a measurement limit parameter; a configuration parameter of a feedback dimension parameter; and a configuration parameter of a feedback mode parameter; and a configuring module configured to perform joint encoding configuration for the M categories of parameters for indicating measurement and feedback, and configuring N parameter sets through higher layer signaling, where N is an integer greater than or equal to 1, and each of the parameter set at least contains a set of joint configuration parameters of the M categories of parameters for indicating measurement and feedback; and an indicating module configured to simultaneously indicate selection information of one or more configured parameter sets corresponding to triggering of one or more channel state information CSI processes when the base station triggers non-periodical CSI feedback through physical layer control signaling.

According to an aspect of the embodiments of the present disclosure, there is provided a terminal for performing a channel state information CSI process, including: a first receiving module configured to receive N parameter sets of measurement and feedback configured by a base station through higher layer signaling, wherein each of the parameter sets contains one or more of M categories of parameters for indicating measurement and feedback, where N is an integer larger than or equal to 1, M is an integer larger than or equal to 1, and the parameter categories contain at least one of: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of a transmission pilot; a configuration parameter of a measurement limit parameter; a configuration parameter of a feedback dimension parameter; and a configuration parameter of a feedback mode parameter; a second receiving module configured to receive selection information of configured parameter sets notified by the base station through physical layer signaling; a second determining module configured to determine a correspondence relationship between the selection information and the one or more CSI processes to be measured and fed back, and a correspondence relationship between the configured parameter sets and each of the CSI processes; and an applying module configured to apply configured categories of parameters in the configured parameter sets for the measurement or feedback of the corresponding CSI process.

An embodiment of the present disclosure further provides a computer-readable storage medium, which stores computer-executable instructions, and implements an information notification method applied to a base station when the computer-executable instructions are executed.

An embodiment of the present disclosure further provides a computer-readable storage medium, which stores computer-executable instructions, and implements a method for performing a CSI process applied to a terminal.

In this embodiment of the present disclosure, a plurality of parameter sets including one or more categories of CSI parameters are configured for a terminal, and the plurality of parameter sets are obtained. The parameter set consists of one or more categories of CSI parameters that are used to indicate CSI measurement and/or feedback. A parameter set corresponding to the CSI process in the plurality of parameter sets is sent to the terminal. Through the embodiment of the present disclosure, it can solve the problem that the standard transparent technology cannot be implemented in the related art, and can achieve an effect of flexibly configuring the CSI parameters to implement the standard transparent technology.

Other aspects can be understood after reading and understanding the drawings and detailed description.

This section provides a summary of various implementations or examples of the technology described in the present disclosure, and is not a comprehensive disclosure of the full scope or all features of the disclosed technology.

BRIEF DESCRIPTION OF THE DRAWINGS

The drawings described herein are provided to provide a further understanding of the present application, and constitute a part of the present application. The exemplary embodiments of the present application and descriptions thereof are used to explain the present application and do not constitute improper limitations to the present application. In the drawing.

DETAILED DESCRIPTION

Hereinafter, the present application will be described in detail with reference to the accompanying drawings and in conjunction with the embodiments. It should be noted that the embodiments in the present application and the features in the embodiments can be combined with each other without conflict.

It should be noted that the terms "first", "second", and the like in the specification and claims of the present application and in the above drawings are used to distinguish similar objects and are not necessarily used to describe a specific order or sequence.

Figure 1:
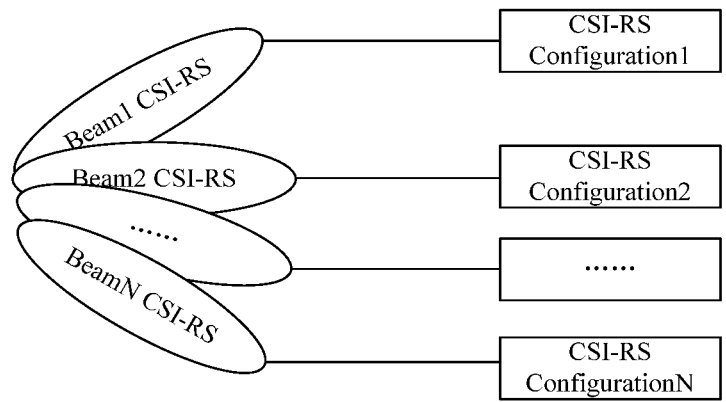
FIG. 1(a) is a schematic diagram of a first relationship between beam CSI-RS and CSI-RS configuration in the related art.
FIG. 1(b) is a schematic diagram of a second relationship between beam CSI-RS and CSI-RS configuration in the related art.
FIG. 1(c) is a schematic diagram of a third relationship between beam CSI-RS and CSI-RS configuration in the related art.
Figure 1:
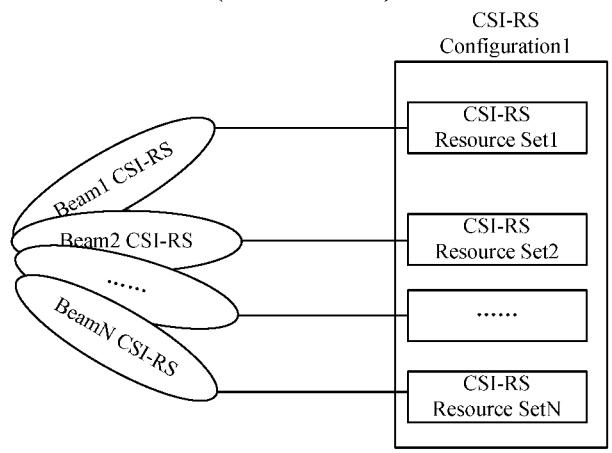
Figure 1:
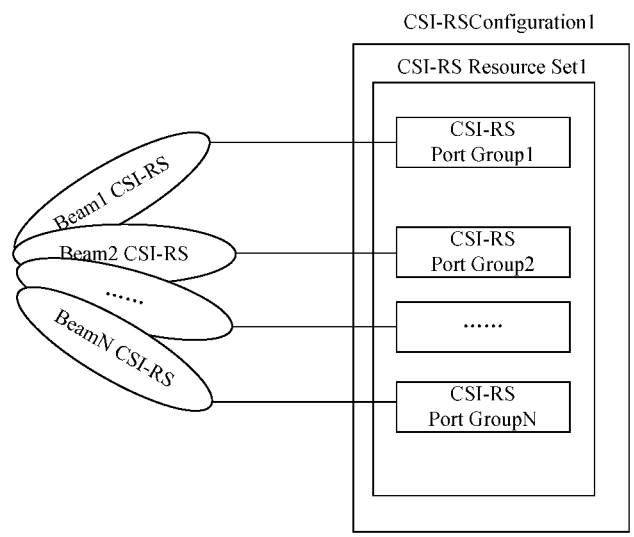
Figure 2:
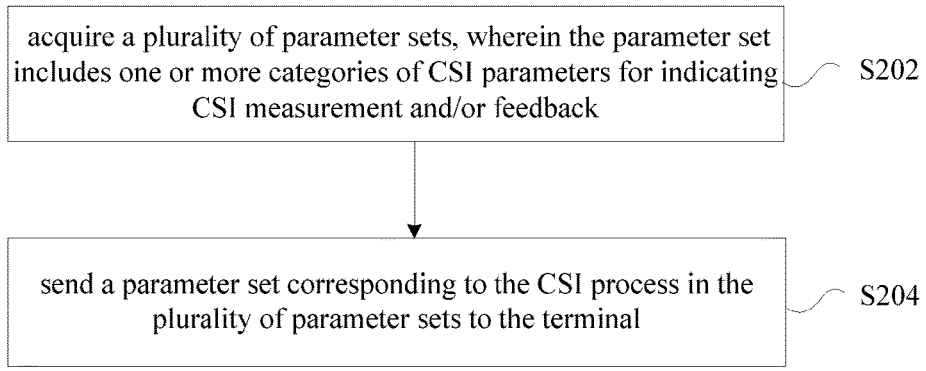
FIG. 2 is a flowchart of an information notification method according to an embodiment of the present disclosure.

In this embodiment, an information notification method is provided. FIG. 2 is a flowchart of an information notification method according to an embodiment of the present disclosure. As shown in FIG. 2, the method includes the following steps.

In step S202, a plurality of parameter sets are acquired, wherein the parameter set includes one or more categories of CSI parameters for indicating CSI measurement and/or feedback.

In step S204, a parameter set corresponding to the CSI process in the plurality of parameter sets is sent to the terminal.

That is, each parameter set may include one or more categories of CSI parameters that are used to indicate performing CSI measurement and/or feedback.

Compared with the related art which uses only one configuration mode, the following defects can be overcome by the technical solution provided by the embodiment of the present disclosure. In performing binding configuration of some CSI parameters with the configuration of the CSI Process, or performing binding configuration with the CSI-RS configuration, the relationship between the CSI parameters and the CSI Process and CSI-RS configuration is determined during high-level configuration. One CSI Process/one set of CSI-RS configurations can only produce one correspondence relationship with the above CSI parameter, which greatly limits the configuration flexibility, and makes a lot of flexible standard transparent technologies unable to be implemented.

In this embodiment of the present disclosure, a plurality of parameter sets including one or more categories of CSI parameters are configured for a terminal, and the plurality of parameter sets are obtained. The parameter set consists of one or more categories of CSI parameters that are used to indicate CSI measurement and/or feedback. A parameter set corresponding to the CSI process in the plurality of parameter sets is sent to the terminal. Through the embodiment of the present disclosure, it can solve the problem that the standard transparent technology cannot be implemented in the related art, and can achieve an effect of flexibly configuring the CSI parameters to implement the standard transparent technology.

Optionally, sending a parameter set corresponding to the CSI process in the plurality of parameter sets to the terminal includes: sending a parameter set corresponding to the CSI process in the plurality of parameter sets to the terminal through control signaling. Here, the control signaling may be a higher layer signaling. In addition, the base station may also send a parameter set corresponding to the CSI process in the plurality of parameter sets to the terminal through physical layer signaling. In this case, there is only one category of CSI parameter in one parameter set.

Through the embodiment of the present disclosure, a parameter set having multiple categories of CSI parameters can be flexibly configured for any CSI process of the terminal.

Optionally, sending a parameter set corresponding to the CSI process in the plurality of parameter sets to the terminal includes: when triggering a CSI process non-periodically, sending a parameter set corresponding to the non-periodic CSI process in the plurality of parameter sets to the terminal.

In this way, the base station can also suddenly trigger the terminal to report CSI information (including RI/PMI/CQI) non-periodically when needed, so as to overcome problems that the real-time performance of the periodic feedback is not high enough, and the CSI quantization accuracy is limited to the overhead of the control channel.

Optionally, the CSI process is triggered non-periodically in the following manner: triggering the CSI process non-periodically through physical layer control signaling.

Optionally, the CSI parameter includes at least one of the following: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of the transmission pilot; a configuration parameter of a measurement limit parameter; a configuration parameter of a feedback dimension parameter; and a configuration parameter of a feedback mode parameter.

The base station determines M categories of CSI parameters that need to be measured and/or fed back, where M is an integer greater than or equal to 1. The categories of CSI parameters are described above, and the CSI parameters in each parameter set include one or more of the above categories.

The base station performs joint configuration for these M categories of parameters, and configures N parameter sets through higher layer signaling. Each Set at least contains a set of joint configuration parameters of the above M categories of parameters. When the base station non-periodically triggers the CSI process through the physical layer control signaling, the base station simultaneously indicates the selection information of one or more sets corresponding to one or more CSI Processes that have been triggered.

Optionally, the CSI parameters further include: a triggering indication parameter of the CSI process and/or a CSI triggering indication parameter of the serving cell. That is, the M categories of parameters in the Set further include a CSI Process triggering indication parameter and/or a CSI triggering indication parameter of the serving cell (carrier).

Optionally, the joint encoding configuration of each of the plurality of parameter sets is triggered in one of the following ways:

performing joint encoding configuration according to triggering indications of the plurality of parameter sets and the CSI process set;

performing joint encoding configuration according to CSI triggering indications of the plurality of parameter sets and the serving cell set; and performing joint encoding configuration according to CSI triggering indications of the plurality of parameter sets, the serving cell set and the CSI process set.

That is, joint encoding configuration of triggering indications of the N sets and the CSI process set is performed, or joint encoding configuration of CSI triggering indications of the N sets and the serving cell (carrier) set is performed, or joint encoding configuration of CSI triggering indications of the N sets, the serving cell (carrier) set and the CSI process set is performed.

Figure 3:
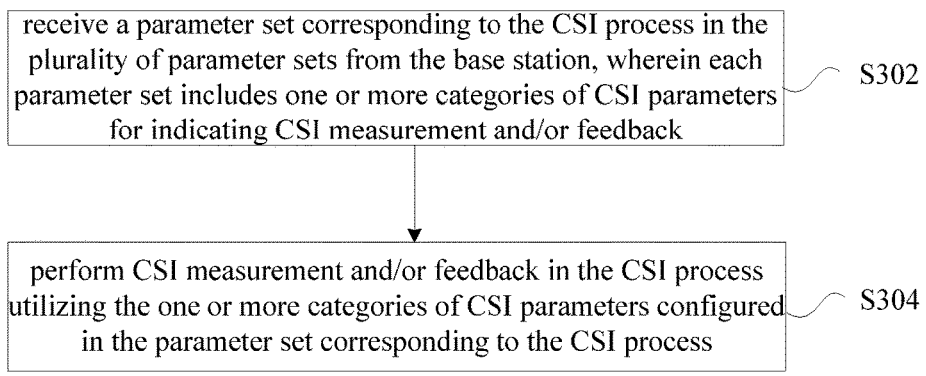
FIG. 3 is a flowchart of a method for performing a CSI process according to an embodiment of the present disclosure.

In this embodiment, a method for performing a CSI process is provided. FIG. 3 is a flowchart of a method for performing a CSI process according to an embodiment of the present disclosure. As shown in FIG. 3, the method includes the following steps.

In Step S302, a parameter set corresponding to the CSI process in the plurality of parameter sets is received from the base station, wherein each parameter set includes one or more categories of CSI parameters for indicating CSI measurement and/or feedback.

In step S304, CSI measurement and/or feedback is performed in the CSI process utilizing the one or more categories of CSI parameters configured in the parameter set corresponding to the CSI process.

That is, each parameter set may include one or more categories of CSI parameters that are used to indicate performing CSI measurement and/or feedback.

Compared with the related art which uses only one configuration mode, the following defects can be overcome by the technical solution provided by the embodiment of the present disclosure. In performing binding configuration of some CSI parameters with the configuration of the CSI Process, or performing binding configuration with the CSI-RS configuration, the relationship between the CSI parameters and the CSI Process and CSI-RS configuration is determined during high-level configuration. One CSI Process/one set of CSI-RS configurations can only produce one correspondence relationship with the above CSI parameter, which greatly limits the configuration flexibility, and makes a lot of flexible standard transparent technologies unable to be implemented.

In this embodiment of the present disclosure, a plurality of parameter sets including one or more categories of CSI parameters are configured for a terminal. It can solve the problem that the standard transparent technology cannot be implemented in the related art, and can achieve an effect of flexibly configuring the CSI parameters to implement the standard transparent technology.

Optionally, when a terminal performs a plurality CSI processes, each CSI process corresponds to one parameter set in the received parameter sets.

The terminal receives N parameter sets used for indicating CSI measurement and/or feedback configured by the base station through higher layer signaling. The Set includes one or more of the M categories of the CSI parameters for indicating CSI measurement and/or feedback. For example, M is an integer greater than or equal to 1. The M categories of parameters include one or more of the following categories: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of the transmission pilot; a configuration parameter of a measurement limit parameter; a configuration parameter of a feedback dimension parameter; and a configuration parameter of a feedback mode parameter.

Optionally, before the step of performing CSI measurement and/or feedback in the CSI process utilizing the one or more categories of CSI parameters configured in the parameter set corresponding to the CSI process, the method further includes: determining a correspondence relationship between each of the plurality CSI processes and the corresponding parameter set in the received parameter sets.

The terminal receives the Set selection information notified by the base station through physical layer signaling. The terminal determines the selected Set and one or more CSI Processes to be fed back, and the correspondence relationship between the Set and the CSI Process. The terminal applies the parameters configured in the Set for the measurement or feedback of the corresponding CSI Process.

Optionally, joint encoding configuration of triggering indications of the N sets and the CSI process set is performed, or joint encoding configuration of CSI triggering indications of the N sets and the serving cell (carrier) set is performed, or joint encoding configuration of CSI triggering indications of the N sets, the serving cell (carrier) set and the CSI process set is performed. Optionally, the M categories of parameters in the parameter Set include a triggering indication parameter of the CSI Process and/or CSI triggering indication parameter of the serving cell (carrier).

Through the description of the above embodiments, those skilled in the art can clearly understand that the method according to the above embodiment can be implemented by means of software in combination with a necessary general hardware platform. Of course, the hardware can also be used, but in many cases, the former is a preferred implementation. Based on this understanding, the part of the technical solution of the present application that essentially or contributing to the related art can be embodied in the form of a software product stored on a storage medium (such as ROM/RAM, magnetic disk, and optical disk). In the above, several instructions are included to enable a terminal device (which may be a mobile phone, a computer, a server, or a network device, etc.) to perform the method of each embodiment of the present application.

Figure 10:
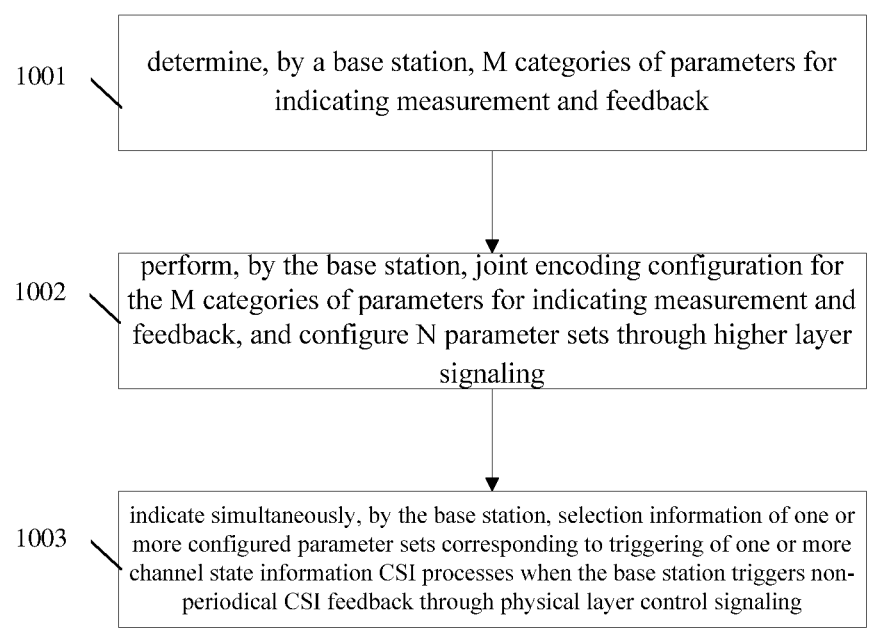
FIG. 10 is a flowchart of another information notification method according to an embodiment of the present disclosure.

As shown in FIG. 10, according to an aspect of an embodiment of the present disclosure, there is provided an information notification method, including the following. A base station determines M categories of parameters for indicating measurement and feedback, where M is an integer greater than or equal to 1, at 1001. The categories of the parameters include at least one of the following: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of the transmission pilot; a configuration parameter of a measurement limit parameter; a configuration parameter of a feedback dimension parameter; and a configuration parameter of a feedback mode parameter. The base station performs joint encoding configuration for these M categories of parameters for indicating measurement and feedback, and configures N parameter sets through higher layer signaling, where N is an integer greater than or equal to 1, at 10002. Each parameter set at least contains a set of joint configuration parameters of the above M categories of parameters for indicating measurement and feedback. When the base station non-periodically triggers the CSI process feedback through the physical layer control signaling, the base station simultaneously indicates the selection information of one or more parameter sets configured corresponding to one or more CSI Processes that have been triggered, at 1003.

Figure 11:
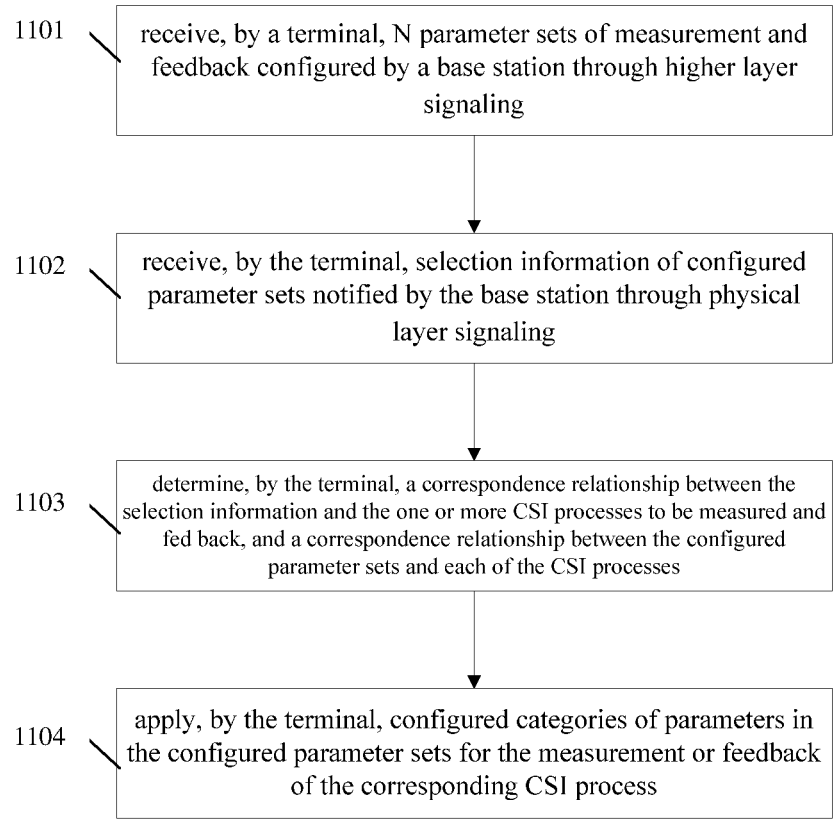
FIG. 11 is a flowchart of another method for performing a CSI process according to an embodiment of the present disclosure.

As shown in FIG. 11, according to an aspect of an embodiment of the present disclosure, a method for performing a CSI process is provided, including the following. The terminal receives N parameter sets of measurement and feedback configured by the base station through higher layer signaling, at 1101. Each parameter set includes one or more of the M categories of the parameters for indicating measurement and feedback, where N is an integer greater than or equal to 1and M is an integer greater than or equal to 1. The categories of the parameters include one or more of the following categories: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of the transmission pilot; a configuration parameter of a measurement limit parameter; a configuration parameter of a feedback dimension parameter; and a configuration parameter of a feedback mode parameter. The terminal receives the selection information of the parameter set notified by the base station through physical layer signaling, at 1102. The terminal determines a correspondence relationship between the selection information and one or more CSI Processes to be measured and fed back, and a correspondence relationship between the configured parameter set and each of the CSI processes, at 1103. The terminal applies the categories of parameters configured in the parameter set for the measurement and feedback of the corresponding CSI Process, at 1104.

The following describes the present application in detail by taking several specific embodiments as examples.

First Embodiment

In the present embodiment, the Set is independently configured and contains feedback category information. The base station may configure N parameter sets for the UE in advance through high layer RRC (Radio Resource Control) signaling. The contents of the N Sets can be configured flexibly. For example, it can be a case of 2 Sets, as shown in Table 4, or may be a case of 4 Sets, as shown in Table 5.

TABLE 4

| Set1 | Feedback class: Class A | Other parameter configuration 1 |
| Set2 | Feedback class: Class B | Other parameter configuration 2 |

TABLE 5

| Set1 | Feedback class: Class A | Other parameter configuration 1 |
| Set2 | Feedback class: Class B | Other parameter configuration 2 |
| Set3 | Feedback class: Class A | Other parameter configuration 3 |
| Set4 | Feedback class: Class A | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines current feedback class is non-periodic feedback, and determines jointly other parameter configurations. Here, the other parameter configurations 1, 2, 3, and 4 allow the same configuration for all categories of parameters.

Below is the case where selection information of the codebook is included. The base station can configure N sets for the UE in advance through high layer RRC signaling. The contents of the N sets can be flexibly configured. For example, it can be a case of 2 Sets, as shown in Table 6, or may be a case of 4 Sets, as shown in Table 7.

TABLE 6

| Set1 | codebook selection: selecting codebook A | Other parameter configuration 1 |
| Set2 | codebook selection: selecting codebook B | Other parameter configuration 2 |

TABLE 7

| Set1 | codebook selection: selecting codebook A | Other parameter configuration 1 |
| Set2 | codebook selection: selecting codebook C | Other parameter configuration 2 |
| Set3 | codebook selection: selecting codebook B | Other parameter configuration 3 |
| Set4 | codebook selection: selecting codebook A | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines codebook information used in the non-periodic feedback, and determines jointly other parameter configurations. Here, the other parameter configurations 1, 2, 3, and 4 allow the same configuration for all categories of parameters.

Below is the case where selection information of the channel measurement resource configuration is included. The base station can configure N sets for the UE in advance through high layer RRC signaling. The contents of the N sets can be flexibly configured. For example, it can be a case of 2 Sets, as shown in Table 8, or may be a case of 4 Sets, as shown in Table 9.

TABLE 8

| Set1 | Selecting channel measurement resource set A | Other parameter configuration 1 |
|---|---|---|
| Set2 | Selecting channel measurement resource set B | Other parameter configuration 2 |

TABLE 9

| Set1 | Selecting channel measurement resource set A | Other parameter configuration 1 |
|---|---|---|
| Set2 | Selecting channel measurement resource set B | Other parameter configuration 2 |
| Set3 | Selecting channel measurement resource set B | Other parameter configuration 3 |
| Set4 | Selecting channel measurement resource set A | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the channel measurement resource set to be measured in the non-periodic feedback, and determines jointly other parameter configurations. Here, the other parameter configurations 1, 2, 3, and 4 allow the same configuration for all categories of parameters.

Below is the case where selection information of the interference measurement resource configuration is included. The base station can configure N sets for the UE in advance through high layer RRC signaling. The contents of the N sets can be flexibly configured. For example, it can be a case of 2 Sets, as shown in Table 10, or may be a case of 4 Sets, as shown in Table 11.

TABLE 10

| Set1 | Selecting interference measurement resource set A | Other parameter configuration 1 |
|---|---|---|
| Set2 | Selecting interference measurement resource set B | Other parameter configuration 2 |

TABLE 11

| Set1 | Selecting interference measurement resource set A | Other parameter configuration 1 |
|---|---|---|
| Set2 | Selecting interference measurement resource set B | Other parameter configuration 2 |

TABLE 11-continued

| Set3 | Selecting interference measurement resource set B | Other parameter configuration 3 |
|---|---|---|
| Set4 | Selecting interference measurement resource set A | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the interference measurement resource set to be measured in the non-periodic feedback, and determines jointly other parameter configurations. Here, the other parameter configurations 1, 2, 3, and 4 allow the same configuration for all categories of parameters.

Below is the case where indication information of pilot multiplexing mode is included. The base station can configure N sets for the UE in advance through high layer RRC signaling. The contents of the N sets can be flexibly configured. For example, it can be a case of 2 Sets, as shown in Table 12, or may be a case of 4 Sets, as shown in Table 13.

TABLE 12

| Set1 | pilot multiplexing mode indication: OCC = 2 | Other parameter configuration 1 |
|---|---|---|
| Set2 | pilot multiplexing mode indication: OCC = 4 | Other parameter configuration 2 |

TABLE 13

| Set1 | pilot multiplexing mode indication: OCC = 2 | Other parameter configuration 1 |
|---|---|---|
| Set2 | pilot multiplexing mode indication: OCC = 2 | Other parameter configuration 2 |
| Set3 | pilot multiplexing mode indication: OCC = 2 | Other parameter configuration 3 |
| Set4 | pilot multiplexing mode indication: OCC = 4 | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines selection information of the Set, and then determines the pilot multiplexing mode of the pilot to be measured in the non-periodic feedback, and determines jointly other parameter configurations. Here, the other parameter configurations 1, 2, 3, and 4 allow the same configuration for all categories of parameters.

Below is the case where indication information of pilot binding parameter is included. The base station can configure N sets for the UE in advance through high layer RRC signaling. The contents of the N sets can be flexibly configured. For example, it can be a case of 2 Sets, as shown in Table 14, or may be a case of 4 Sets, as shown in Table 15.

TABLE 14

| Set1 | pilot binding parameter: binding | Other parameter configuration 1 |
|---|---|---|
| Set2 | pilot binding parameter: no binding | Other parameter configuration 2 |

TABLE 15

| | | |
|---|---|---|
| Set1 | pilot binding parameter: binding granularity 1 RB | Other parameter configuration 1 |
| Set2 | pilot binding parameter: binding granularity 1 subband | Other parameter configuration 2 |
| Set3 | pilot binding parameter: binding granularity 2 subbands | Other parameter configuration 3 |
| Set4 | pilot binding parameter: binding granularity full band | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the binding parameter of the pilot to be measured in the non-periodic feedback, and determines jointly other parameter configurations. Here, the other parameter configurations 1, 2, 3, and 4 allow the same configuration for all categories of parameters.

Below is the case where indication information of the pilot power parameter is included. The base station can configure N sets for the UE in advance through high layer RRC signaling. The contents of the N sets can be flexibly configured. For example, it can be a case of 2 Sets, as shown in Table 16, or may be a case of 4 Sets, as shown in Table 17.

TABLE 16

| | | |
|---|---|---|
| Set1 | pilot power parameter: 3 dB | Other parameter configuration 1 |
| Set2 | pilot power parameter: 6 dB | Other parameter configuration 2 |

TABLE 17

| | | |
|---|---|---|
| Set1 | pilot power parameter: 6 dB | Other parameter configuration 1 |
| Set2 | pilot power parameter: 6 dB | Other parameter configuration 2 |
| Set3 | pilot power parameter: 0 dB | Other parameter configuration 3 |
| Set4 | pilot power parameter: 3 dB | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the power parameter of the pilot to be measured in the non-periodic feedback, and determines jointly other parameter configurations. Here, the other parameter configurations 1, 2, 3, and 4 allow the same configuration for all categories of parameters.

Below is the case where indication information of the pilot frequency domain position parameter is included. The base station can configure N sets for the UE in advance through high layer RRC signaling. The contents of the N sets can be flexibly configured. For example, it can be a case of 2 Sets, as shown in Table 18, or may be a case of 4 Sets, as shown in Table 19.

TABLE 18

| | | |
|---|---|---|
| Set1 | pilot frequency domain position parameter: full band | Other parameter configuration 1 |

TABLE 18-continued

| | | |
|---|---|---|
| Set2 | pilot frequency domain position parameter: ½ band | Other parameter configuration 2 |

TABLE 19

| | | |
|---|---|---|
| Set1 | pilot frequency domain position parameter: full band | Other parameter configuration 1 |
| Set2 | pilot frequency domain position parameter: full band | Other parameter configuration 2 |
| Set3 | pilot frequency domain position parameter: ¼ band | Other parameter configuration 3 |
| Set4 | pilot frequency domain position parameter: ½ band | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the power parameter of the pilot to be measured in the non-periodic feedback, and determines jointly other parameter configurations. Here, the other parameter configurations 1, 2, 3, and 4 allow the same configuration for all categories of parameters.

Below is the case where indication information of the measurement resource limit parameter is included. The base station can configure N sets for the UE in advance through high layer RRC signaling. The contents of the N sets can be flexibly configured. For example, it can be a case of 2 Sets, as shown in Table 20, or may be a case of 4 Sets, as shown in Table 21.

TABLE 20

| | | |
|---|---|---|
| Set1 | measurement resource limit parameter: limit enabling | Other parameter configuration 1 |
| Set2 | measurement resource limit parameter: limit disabling | Other parameter configuration 2 |

TABLE 21

| | | |
|---|---|---|
| Set1 | measurement resource limit parameter: 1 subframe | Other parameter configuration 1 |
| Set2 | measurement resource limit parameter: 2 subframes | Other parameter configuration 2 |
| Set3 | measurement resource limit parameter: 10 subframes | Other parameter configuration 3 |
| Set4 | measurement resource limit parameter: disabling | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the measurement resource limit parameter to be measured in the non-periodic feedback, and determines jointly other parameter configurations. Here, the other parameter configurations 1, 2, 3, and 4 allow the same configuration for all categories of parameters.

Below is the case where configuration information of the feedback mode is included. The base station can configure N sets for the UE in advance through high layer RRC signaling. The contents of the N sets can be flexibly configured. For example, it can be a case of 2 Sets, as shown in Table 22, or may be a case of 4 Sets, as shown in Table 23.

TABLE 22

| Set1 | feedback mode configuration information: Mode 3-1 | Other parameter configuration 1 |
|---|---|---|
| Set2 | feedback mode configuration information: Mode 3-2 | Other parameter configuration 2 |

TABLE 23

| Set1 | feedback mode configuration information: Mode 3-1 | Other parameter configuration 1 |
|---|---|---|
| Set2 | feedback mode configuration information: Mode 3-1 | Other parameter configuration 2 |
| Set3 | feedback mode configuration information: Mode 3-2 | Other parameter configuration 3 |
| Set4 | feedback mode configuration information: Mode 3-2 | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the feedback mode configuration information to be measured in the non-periodic feedback, and determines jointly other parameter configurations. Here, the other parameter configurations 1, 2, 3, and 4 allow the same configuration for all categories of parameters.

Below is the case where configuration information of the feedback dimension L is included. The base station can configure N sets for the UE in advance through high layer RRC signaling. The contents of the N sets can be flexibly configured. For example, it can be a case of 2 Sets, as shown in Table 24, or may be a case of 4 Sets, as shown in Table 25.

TABLE 24

| Set1 | feedback dimension configuration information: L = Nk | Other parameter configuration 1 |
|---|---|---|
| Set2 | feedback dimension configuration information: L = sum(Nk) | Other parameter configuration 2 |

TABLE 25

| Set1 | feedback dimension configuration information: L = Nk | Other parameter configuration 1 |
|---|---|---|
| Set2 | feedback dimension configuration information: L = Nk | Other parameter configuration 2 |
| Set3 | feedback dimension configuration information: L = 2 | Other parameter configuration 3 |
| Set4 | feedback dimension configuration information: L = 4 | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the configuration information of the feedback dimension L to be measured in the non-periodic feedback, and determines jointly other parameter configurations. Here, the other parameter configurations 1, 2, 3, and 4 allow the same configuration for all categories of parameters.

Second Embodiment

In the present embodiment, the Set is jointly configured with the Process.

Below is the case where feedback category information is included. The base station may configure N sets for the UE in advance through high layer RRC signaling. The contents of the N Sets can be configured flexibly. For example, it can be a case of 2 Sets, as shown in Table 26, or may be a case of 4 Sets, as shown in Table 27.

TABLE 26

| Set1 | CSI Process Set 1 | Feedback class: Class A | Other parameter configuration 1 |
|---|---|---|---|
| Set2 | CSI Process Set 2 | Feedback class: Class B | Other parameter configuration 2 |

TABLE 27

| Set1 | CSI Process Set 1 | Feedback class: Class A | Other parameter configuration 1 |
|---|---|---|---|
| Set2 | CSI Process Set 1 | Feedback class: Class B | Other parameter configuration 2 |
| Set3 | CSI Process Set 2 | Feedback class: Class A | Other parameter configuration 3 |
| Set4 | CSI Process Set 2 | Feedback class: Class A | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the triggered Process and the corresponding feedback category of the non-periodic feedback, and determines jointly other parameter configurations. Here, the other parameter configurations 1, 2, 3, and 4 allow the same configuration for all categories of parameters.

Below is the case where selection information of the codebook is included. The base station can configure N sets for the UE in advance through high layer RRC signaling. The contents of the N sets can be flexibly configured. For example, it can be a case of 2 Sets, as shown in Table 28, or may be a case of 4 Sets, as shown in Table 29.

TABLE 28

| Set1 | CSI Process Set 1 | codebook selection: selecting codebook A | Other parameter configuration 1 |
|---|---|---|---|
| Set2 | CSI Process Set 2 | codebook selection: selecting codebook B | Other parameter configuration 2 |

TABLE 29

| Set1 | CSI Process Set 1 | codebook selection: selecting codebook A | Other parameter configuration 1 |
|---|---|---|---|
| Set2 | CSI Process Set 1 | codebook selection: selecting codebook C | Other parameter configuration 2 |
| Set3 | CSI Process Set 2 | codebook selection: selecting codebook B | Other parameter configuration 3 |
| Set4 | CSI Process Set 2 | codebook selection: selecting codebook A | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the triggered Process and corresponding codebook information used in the non-periodic feedback, and determines jointly other parameter configurations. Here, the other parameter configurations 1, 2, 3, and 4 allow the same configuration for all categories of parameters.

Below is the case where selection information of the channel measurement resource configuration is included. The base station can configure N sets for the UE in advance through high layer RRC signaling. The contents of the N sets can be flexibly configured. For example, it can be a case of 2 Sets, as shown in Table 30, or may be a case of 4 Sets, as shown in Table 31.

TABLE 30

| Set1 | CSI Process Set 1 | Selecting channel measurement resource set A | Other parameter configuration 1 |
|---|---|---|---|
| Set2 | CSI Process Set 2 | Selecting channel measurement resource set B | Other parameter configuration 2 |

TABLE 31

| Set1 | CSI Process Set 1 | Selecting channel measurement resource set A | Other parameter configuration 1 |
|---|---|---|---|
| Set2 | CSI Process Set 3 | Selecting channel measurement resource set B | Other parameter configuration 2 |
| Set3 | CSI Process Set 2 | Selecting channel measurement resource set B | Other parameter configuration 3 |
| Set4 | CSI Process Set 4 | Selecting channel measurement resource set A | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the triggered Process and corresponding channel measurement resource set to be measured in the non-periodic feedback, and determines jointly other parameter configurations. Here, the other parameter configurations 1, 2, 3, and 4 allow the same configuration for all categories of parameters.

Below is the case where selection information of the interference measurement resource configuration is included. The base station can configure N sets for the UE in advance through high layer RRC signaling. The contents of the N sets can be flexibly configured. For example, it can be a case of 2 Sets, as shown in Table 32, or may be a case of 4 Sets, as shown in Table 33.

TABLE 32

| Set1 | CSI Process Set 1 | Selecting interference measurement resource set A | Other parameter configuration 1 |
|---|---|---|---|
| Set2 | CSI Process Set 2 | Selecting interference measurement resource set B | Other parameter configuration 2 |

TABLE 33

| Set1 | CSI Process Set 1 | Selecting interference measurement resource set A | Other parameter configuration 1 |
|---|---|---|---|
| Set2 | CSI Process Set 2 | Selecting interference measurement resource set B | Other parameter configuration 2 |
| Set3 | CSI Process Set 3 | Selecting interference measurement resource set B | Other parameter configuration 3 |
| Set4 | CSI Process Set 4 | Selecting interference measurement resource set A | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the triggered Process and the corresponding interference measurement resource set to be measured in the non-periodic feedback, and determines jointly other parameter configurations. Here, the other parameter configurations 1, 2, 3, and 4 allow the same configuration for all categories of parameters.

Below is the case where indication information of pilot multiplexing mode is included. The base station can configure N sets for the UE in advance through high layer RRC signaling. The contents of the N sets can be flexibly configured. For example, it can be a case of 2 Sets, as shown in Table 34, or may be a case of 4 Sets, as shown in Table 35.

TABLE 34

| Set1 | CSI Process Set 1 | pilot multiplexing mode indication: OCC = 2 | Other parameter configuration 1 |
|---|---|---|---|
| Set2 | CSI Process Set 2 | pilot multiplexing mode indication: OCC = 4 | Other parameter configuration 2 |

TABLE 35

| Set1 | CSI Process Set 1 | pilot multiplexing mode indication: OCC = 2 | Other parameter configuration 1 |
|---|---|---|---|
| Set2 | CSI Process Set 2 | pilot multiplexing mode indication:OCC = 2 | Other parameter configuration 2 |
| Set3 | CSI Process Set 3 | pilot multiplexing mode indication: OCC = 2 | Other parameter configuration 3 |
| Set4 | CSI Process Set 3 | pilot multiplexing mode indication: OCC = 4 | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines selection information of the Set, and then determines the triggered Process and the corresponding pilot multiplexing mode of the pilot to be measured in the non-periodic feedback, and determines jointly other parameter configurations. Here, the other parameter configurations 1, 2, 3, and 4 allow the same configuration for all categories of parameters.

Below is the case where indication information of pilot binding parameter is included. The base station can configure N sets for the UE in advance through high layer RRC signaling. The contents of the N sets can be flexibly configured. For example, it can be a case of 2 Sets, as shown in Table 36, or may be a case of 4 Sets, as shown in Table 37.

TABLE 36

| Set1 | CSI Process Set 1 | pilot binding parameter: binding | Other parameter configuration 1 |
|---|---|---|---|
| Set2 | CSI Process Set 2 | pilot binding parameter: no binding | Other parameter configuration 2 |

TABLE 37

| Set1 | CSI Process Set 1 | pilot binding parameter: binding granularity 1 RB | Other parameter configuration 1 |
|---|---|---|---|
| Set2 | CSI Process Set 1 | pilot binding parameter: binding granularity 1 subband | Other parameter configuration 2 |
| Set3 | CSI Process Set 1 | pilot binding parameter: binding granularity 2 subbands | Other parameter configuration 3 |
| Set4 | CSI Process Set 1 | pilot binding parameter: binding granularity full band | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the triggered Process and the corresponding binding parameter of the pilot to be measured in the non-periodic feedback, and determines jointly other parameter configurations. Here, the other parameter configurations 1, 2, 3, and 4 allow the same configuration for all categories of parameters.

Below is the case where indication information of the pilot power parameter is included. The base station can configure N sets for the UE in advance through high layer RRC signaling. The contents of the N sets can be flexibly configured. For example, it can be a case of 2 Sets, as shown in Table 38, or may be a case of 4 Sets, as shown in Table 39.

TABLE 38

| Set1 | CSI Process Set 1 | pilot power parameter: 3 dB | Other parameter configuration 1 |
|---|---|---|---|
| Set2 | CSI Process Set 2 | pilot power parameter: 6 dB | Other parameter configuration 2 |

TABLE 39

| Set1 | CSI Process Set 1 | pilot power parameter: 6 dB | Other parameter configuration 1 |
|---|---|---|---|
| Set2 | CSI Process Set 2 | pilot power parameter: 6 dB | Other parameter configuration 2 |
| Set3 | CSI Process Set 1 | pilot power parameter: 0 dB | Other parameter configuration 3 |
| Set4 | CSI Process Set 1 | pilot power parameter: 3 dB | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the triggered Process and the corresponding power parameter of the pilot to be measured in the non-periodic feedback, and determines jointly other parameter configurations. Here, the other parameter configurations 1, 2, 3, and 4 allow the same configuration for all categories of parameters.

Below is the case where indication information of the pilot frequency domain position parameter is included. The base station can configure N sets for the UE in advance through high layer RRC signaling. The contents of the N sets can be flexibly configured. For example, it can be a case of 2 Sets, as shown in Table 40, or may be a case of 4 Sets, as shown in Table 41.

TABLE 40

| Set1 | CSI Process Set 1 | pilot frequency domain position parameter: full band | Other parameter configuration 1 |
|---|---|---|---|
| Set2 | CSI Process Set 2 | pilot frequency domain position parameter: ½ band | Other parameter configuration 2 |

TABLE 41

| Set1 | CSI Process Set 1 | pilot frequency domain position parameter: full band | Other parameter configuration 1 |
|---|---|---|---|
| Set2 | CSI Process Set 2 | pilot frequency domain position parameter: full band | Other parameter configuration 2 |
| Set3 | CSI Process Set 1 | pilot frequency domain position parameter: ¼ band | Other parameter configuration 3 |
| Set4 | CSI Process Set 1 | pilot frequency domain position parameter: ½ band | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the triggered Process and the corresponding power parameter of the pilot to be measured in the non-periodic feedback, and determines jointly other parameter configurations. Here, the other parameter configurations 1, 2, 3, and 4 allow the same configuration for all categories of parameters.

Below is the case where indication information of the measurement resource limit parameter is included. The base station can configure N sets for the UE in advance through high layer RRC signaling. The contents of the N sets can be flexibly configured. For example, it can be a case of 2 Sets, as shown in Table 42, or may be a case of 4 Sets, as shown in Table 43.

TABLE 42

| Set1 | CSI Process Set 1 | measurement resource limit parameter: limit enabling | Other parameter configuration 1 |
|---|---|---|---|
| Set2 | CSI Process Set 2 | measurement resource limit parameter: limit disabling | Other parameter configuration 2 |

TABLE 43

| Set1 | CSI Process Set 1 | measurement resource limit parameter: limit enabling | Other parameter configuration 1 |
|---|---|---|---|
| Set2 | CSI Process Set 2 | measurement resource limit parameter: limit disabling | Other parameter configuration 2 |

TABLE 43-continued

| Set3 | CSI Process Set 2 | measurement resource limit parameter: 1 subframe | Other parameter configuration 3 |
| Set4 | CSI Process Set 2 | measurement resource limit parameter: 2 subframes | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the triggered Process and the corresponding measurement resource limit parameter to be measured in the non-periodic feedback, and determines jointly other parameter configurations. Here, the other parameter configurations 1, 2, 3, and 4 allow the same configuration for all categories of parameters.

Below is the case where configuration information of the feedback mode is included. The base station can configure N sets for the UE in advance through high layer RRC signaling. The contents of the N sets can be flexibly configured. For example, it can be a case of 2 Sets, as shown in Table 44, or may be a case of 4 Sets, as shown in Table 45.

TABLE 44

| Set1 | CSI Process Set 1 | feedback mode configuration information: Mode 3-1 | Other parameter configuration 1 |
| Set2 | CSI Process Set 2 | feedback mode configuration information: Mode 3-2 | Other parameter configuration 2 |

TABLE 45

| Set1 | CSI Process Set 1 | feedback mode configuration information: Mode 3-1 | Other parameter configuration 1 |
| Set2 | CSI Process Set 2 | feedback mode configuration information: Mode 3-1 | Other parameter configuration 2 |
| Set3 | CSI Process Set 3 | feedback mode configuration information: Mode 3-2 | Other parameter configuration 3 |
| Set4 | CSI Process Set 3 | feedback mode configuration information: Mode 3-2 | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the triggered Process and the corresponding feedback mode configuration information to be measured in the non-periodic feedback, and determines jointly other parameter configurations. Here, the other parameter configurations 1, 2, 3, and 4 allow the same configuration for all categories of parameters.

Below is the case where configuration information of the feedback dimension L is included. The base station can configure N sets for the UE in advance through high layer RRC signaling. The contents of the N sets can be flexibly configured. For example, it can be a case of 2 Sets, as shown in Table 46, or may be a case of 4 Sets, as shown in Table 47.

TABLE 46

| Set1 | CSI Process Set 1 | feedback dimension configuration information: $L = Nk$ | Other parameter configuration 1 |
| Set2 | CSI Process Set 2 | feedback dimension configuration information: $L = sum(Nk)$ | Other parameter configuration 2 |

TABLE 47

| Set1 | CSI Process Set 1 | feedback dimension configuration information: $L = Nk$ | Other parameter configuration 1 |
| Set2 | CSI Process Set 2 | feedback dimension configuration information: $L = Nk$ | Other parameter configuration 2 |
| Set3 | CSI Process Set 3 | feedback dimension configuration information: $L = 2$ | Other parameter configuration 3 |
| Set4 | CSI Process Set 3 | feedback dimension configuration information: $L = 4$ | Other parameter configuration 4 |

The base station indicates Set selection information through physical layer control signaling; the terminal receives the high layer configuration signaling of the Set sent by the base station, determines the parameter set content of each Set, and the terminal receives the indication information of the physical layer control signaling, determines the selection information of the Set, and then determines the triggered Process and the corresponding configuration information of the feedback dimension L to be measured in the non-periodic feedback, and determines jointly other parameter configurations. Here, the other parameter configurations 1, 2, 3, and 4 allow the same configuration for all categories of parameters.

Third Embodiment

Figure 4:
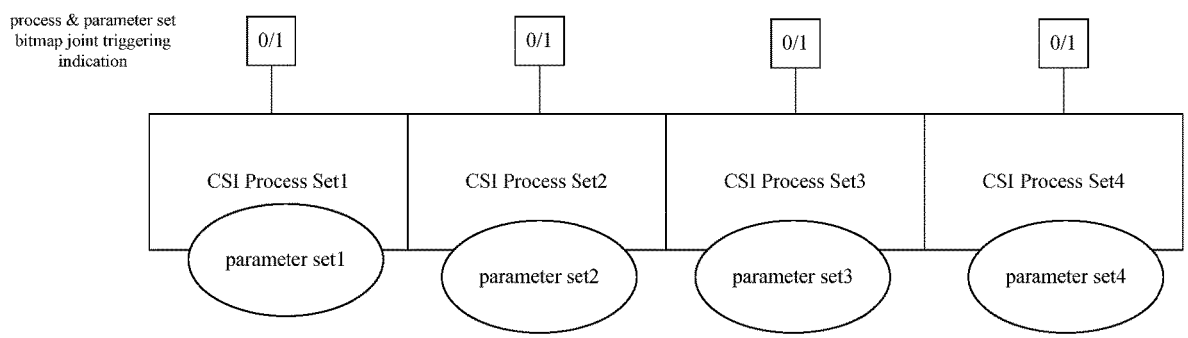
FIG. 4(a) is a schematic diagram of a first joint triggering indication of a process, a set, and a bitmap according to an embodiment of the present disclosure.
FIG. 4(b) is a schematic diagram of a second joint triggering indication of a process, a set, and a bitmap according to an embodiment of the present disclosure
Figure 4:
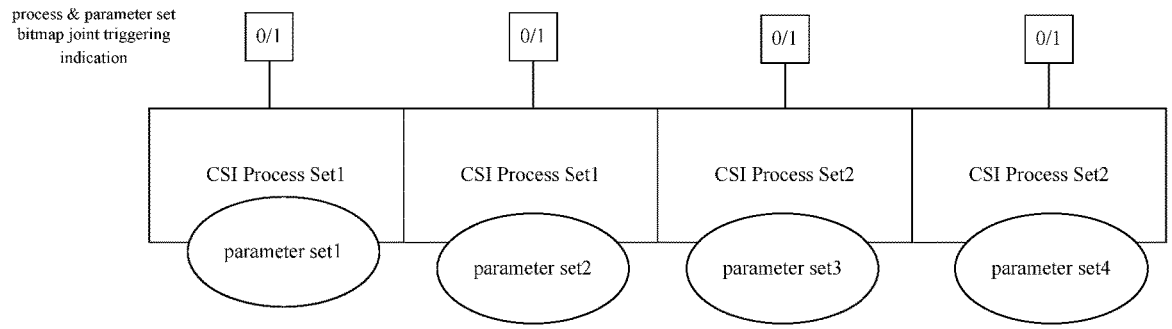

In this embodiment, the case where a plurality of Processes are jointly triggered is described. The base station may trigger one or more CSI Process sets at the same time, and can also trigger CSI feedbacks respectively corresponding to multiple different parameters of a Process at the same time. The base station previously configures signaling corresponding to triggering indications of the four CSI Process Sets and joint configuration of the parameter set. The base station indicates the triggering of the CSI Process set and joint configuration of corresponding parameters with bitmap signaling, as shown in FIG. 4(*a*) and FIG. 4(*b*).

The terminal receives the configuration signaling from the base station to obtain joint coding information of Process and parameter set. The terminal receives the triggering of the CSI Process set and the joint configuration information of corresponding parameters indicated in the bitmap signaling; obtains the triggered Process and the corresponding parameter Set. The parameters in the parameter set may include at least one of the following that has been mentioned in the foregoing embodiments: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of the transmission pilot; a configuration parameter of a measurement limit parameter; a configuration parameter of a feedback dimension parameter; and a configuration parameter of a feedback mode parameter.

Fourth Embodiment

As the methods in the first, second and third embodiments, when applied to multiple cells/service carriers, the CSI process set may be replaced with a cell set or a service carrier set.

Fifth Embodiment

Figure 5:
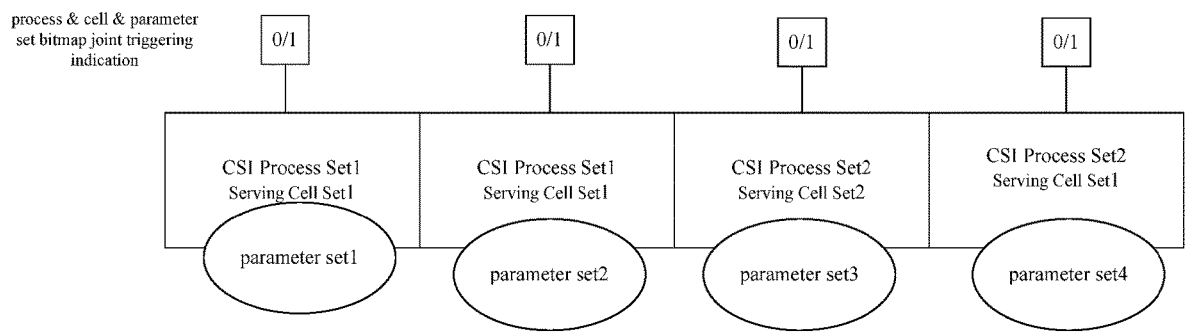
FIG. 5(a) is a schematic diagram of a first joint triggering indication of Process, Cell, set, and a bitmap according to an embodiment of the present disclosure.
FIG. 5(b) is a schematic diagram of a second joint triggering indication of Process, Cell, set, and a bitmap according to an embodiment of the present disclosure.
FIG. 5(c) is a schematic diagram of a third joint triggering indication of Process, Cell, set, and a bitmap according to an embodiment of the present disclosure.
Figure 5:
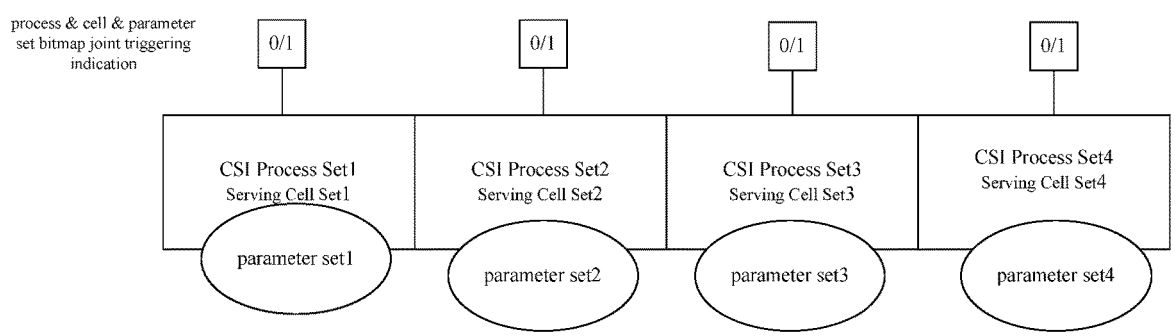
Figure 5:
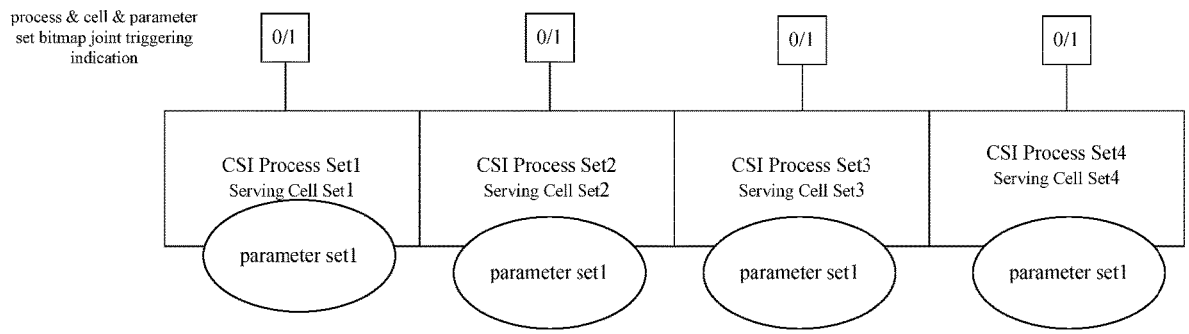

The base station previously configures signaling corresponding to triggering indications of the four CSI Process Sets, indication of the cell (carrier) set and joint configuration of the parameter set. The base station indicates the triggering of the CSI Process set and joint configuration of corresponding parameters with bitmap signaling, as shown in FIG. 5(a), FIG. 5(b) and FIG. 5(c).

The terminal receives the configuration signaling from the base station to obtain joint coding information of Process, cell and parameter set. The terminal receives the triggering of the CSI Process set, the Cell set and the joint configuration information of corresponding parameters indicated in the bitmap signaling; obtains the triggered Process set, the cell set and the corresponding parameter Set. The parameters in the parameter set may include at least one of the following that has been mentioned in the foregoing embodiments: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of the transmission pilot; a configuration parameter of a measurement limit parameter; a configuration parameter of a feedback dimension parameter; and a configuration parameter of a feedback mode parameter.

In this embodiment, a base station is further provided. The base station is configured to implement the foregoing embodiments and optional implementations, and the description thereof has already been given and will not be repeated. As used below, the term "module" may implement a combination of software and/or hardware of a predetermined function. Although the device described in the following embodiment is preferably implemented in software, implementation of hardware or a combination of software and hardware is also possible and conceived.

Figure 6:
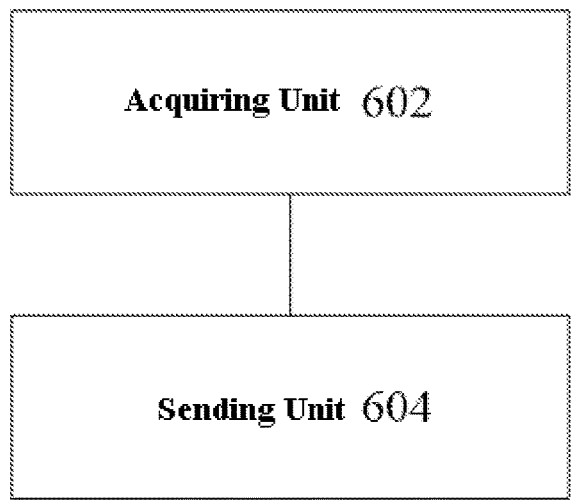
FIG. 6 is a structural block diagram of a base station according to an embodiment of the present disclosure.

FIG. 6 is a structural block diagram of a base station according to an embodiment of the present disclosure. As shown in FIG. 6, the base station for sending a notification to a terminal includes: an acquiring unit 602 configured to acquire a plurality of parameter sets, wherein the parameter set includes one or more categories of CSI parameters for indicating CSI measurement and/or feedback; and a sending unit 604 configured to send a parameter set corresponding to the CSI process in the plurality of parameter sets to the terminal.

That is, each parameter set may include one or more categories of CSI parameters that are used to indicate performing CSI measurement and/or feedback.

Compared with the related art which uses only one configuration mode, the following defects can be overcome by the technical solution provided by the embodiment of the present disclosure. In performing binding configuration of some CSI parameters with the configuration of the CSI Process, or performing binding configuration with the CSI-RS configuration, the relationship between the CSI parameters and the CSI Process and CSI-RS configuration is determined during high-level configuration. One CSI Process/one set of CSI-RS configurations can only produce one correspondence relationship with the above CSI parameter, which greatly limits the configuration flexibility, and makes a lot of flexible standard transparent technologies unable to be implemented.

In this embodiment of the present disclosure, a plurality of parameter sets including one or more categories of CSI parameters are configured for a terminal, and the plurality of parameter sets are obtained. The parameter set consists of one or more categories of CSI parameters that are used to indicate CSI measurement and/or feedback. A parameter set corresponding to the CSI process in the plurality of parameter sets is sent to the terminal. Through the embodiment of the present disclosure, it can solve the problem that the standard transparent technology cannot be implemented in the related art, and can achieve an effect of flexibly configuring the CSI parameters to implement the standard transparent technology.

Optionally, the sending unit 604 is also configured to send a parameter set corresponding to the CSI process in the plurality of parameter sets to the terminal through control signaling.

Through the embodiment of the present disclosure, a parameter set having multiple categories of CSI parameters can be flexibly configured for any CSI process of the terminal.

Optionally, the sending unit 604 is also configured to, when triggering a CSI process non-periodically, send a parameter set corresponding to the non-periodically triggered CSI process in the plurality of parameter sets to the terminal.

In this way, the base station can also suddenly trigger the terminal to report CSI information (including RI/PMI/CQI) non-periodically when needed, so as to overcome problems that the real-time performance of the periodic feedback is not high enough, and the CSI quantization accuracy is limited to the overhead of the control channel.

Optionally, the above base station further includes a first triggering unit configured to trigger the CSI process non-periodically through physical layer control signaling.

The base station determines M categories of CSI parameters that need to be measured and/or fed back, where M is an integer greater than or equal to 1. The categories of CSI parameters are described above, and the CSI parameters in each of the parameter sets include one or more of the above categories.

The base station performs joint configuration for these M categories of parameters, and configures N parameter sets through higher layer signaling. Each Set at least contains a set of joint configuration parameters of the above M categories. When the base station non-periodically triggers the CSI process through the physical layer control signaling, the base station simultaneously indicates the selection information of one or more sets corresponding to one or more CSI Processes that have been triggered.

Optionally, the above base station further includes a second triggering unit configured to trigger the joint encoding configuration of each of the plurality of parameter sets in one of the following ways: performing joint encoding configuration according to triggering indications of the plurality of parameter sets and the CSI process set; performing joint encoding configuration according to CSI triggering indications of the plurality of parameter sets and the serving cell set; and performing joint encoding configuration according to CSI triggering indications of the plurality of parameter sets, the serving cell set and the CSI process set.

That is, joint encoding configuration of triggering indications of the N sets and the CSI process set is performed, or joint encoding configuration of CSI triggering indications of the N sets and the serving cell (carrier) set is performed, or joint encoding configuration of CSI triggering indications of the N sets, the serving cell (carrier) set and the CSI process set is performed.

In this embodiment, a terminal is further provided. The terminal is configured to implement the foregoing embodiments and optional implementations, and the description thereof has already been given and will not be repeated. As used below, the term "module" may implement a combination of software and/or hardware of a predetermined function. Although the device described in the following embodiment is preferably implemented in software, implementation of hardware or a combination of software and hardware is also possible and conceived.

Figure 7:
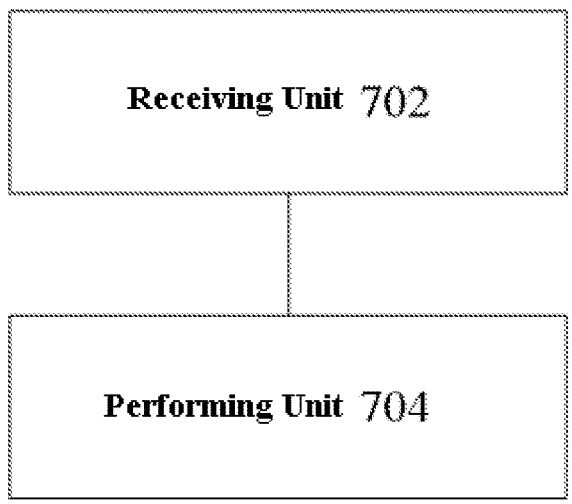
FIG. 7 is a structural block diagram of a terminal according to an embodiment of the present disclosure.

FIG. 7 is a structural block diagram of a terminal according to an embodiment of the present disclosure. As shown in FIG. 7, the terminal for performing a CSI process includes a receiving unit 702 configured to receive from the base station a parameter set corresponding to the CSI process in the plurality of parameter sets, wherein each parameter set includes one or more categories of CSI parameters for indicating CSI measurement and/or feedback; and a performing unit 704 configured to perform CSI measurement and/or feedback in the CSI process utilizing the one or more categories of CSI parameters configured in the parameter set corresponding to the CSI process.

That is, each parameter set may include one or more categories of CSI parameters that are used to indicate performing CSI measurement and/or feedback.

Compared with the related art which uses only one configuration mode, the following defects can be overcome by the technical solution provided by the embodiment of the present disclosure. In performing binding configuration of some CSI parameters with the configuration of the CSI Process, or performing binding configuration with the CSI-RS configuration, the relationship between the CSI parameters and the CSI Process and CSI-RS configuration is determined during high-level configuration. One CSI Process/one set of CSI-RS configurations can only produce one correspondence relationship with the above CSI parameter, which greatly limits the configuration flexibility, and makes a lot of flexible standard transparent technologies unable to be implemented.

In this embodiment of the present disclosure, a plurality of parameter sets including one or more categories of CSI parameters are configured for a terminal. It can solve the problem that the standard transparent technology cannot be implemented in the related art, and can achieve an effect of flexibly configuring the CSI parameters to implement the standard transparent technology.

The terminal receives N parameter sets used for indicating CSI measurement and/or feedback configured by the base station through higher layer signaling. The Set includes one or more of the M categories of the CSI parameters for indicating CSI measurement and/or feedback. For example, M is an integer greater than or equal to 1. The M categories of parameters include one or more of the following categories: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of the transmission pilot; a configuration parameter of a measurement limit parameter; a configuration parameter of a feedback dimension parameter; and a configuration parameter of a feedback mode parameter.

Optionally, when a terminal performs a plurality CSI processes, each CSI process corresponds to one parameter set in the received parameter sets. The terminal further includes a determining unit configured to, before the performing unit 704 performs CSI measurement and/or feedback in the CSI process utilizing the one or more categories of CSI parameters configured in the parameter set corresponding to the CSI process, determine a correspondence relationship between each of the plurality CSI processes and the corresponding parameter set in the received parameter sets.

The terminal receives the Set selection information notified by the base station through physical layer signaling. The terminal determines the selected Set and one or more CSI Processes to be fed back, and the correspondence relationship between the Set and the CSI Process. The terminal applies the parameters configured in the Set for the measurement or feedback of the corresponding CSI Process.

Optionally, joint encoding configuration of triggering indications of the N sets and the CSI process set is performed, or joint encoding configuration of CSI triggering indications of the N sets and the serving cell (carrier) set is performed, or joint encoding configuration of CSI triggering indications of the N sets, the serving cell (carrier) set and the CSI process set is performed. Optionally, the M categories of parameters in the parameter Set include a triggering indication parameter of the CSI Process and/or CSI triggering indication parameter of the serving cell (carrier).

Figure 8:
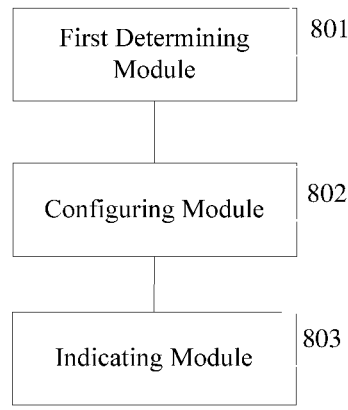
FIG. 8 is a structural block diagram of another base station according to an embodiment of the present disclosure.

As shown in FIG. 8, according to another aspect of an embodiment of the present disclosure, there is provided a base station for sending a notification to a terminal, including: a first determining module 801 configured to determine M categories of parameters for indicating measurement and feedback, where M is an integer greater than or equal to 1, and the categories of the parameters include at least one of the following: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of the transmission pilot; a configuration parameter of a measurement limit parameter; a configuration parameter of a feedback dimension parameter; and a configuration parameter of a feedback mode parameter. The terminal further includes a configuring module 802 configured to perform joint encoding configuration for these M categories of parameters for indicating measurement and feedback, and configure N parameter sets through higher layer signaling, where N is an integer greater than or equal to 1, and each parameter set at least contains a set of joint configuration parameters of the above M categories of parameters for indicating measurement and feedback. The terminal further includes an indicating module 803 configured to, when the base station non-periodically triggers the CSI process through the physical layer control signaling, simultaneously indicate the selection information of one or more sets configured corresponding to one or more CSI Processes that have been triggered.

Figure 9:
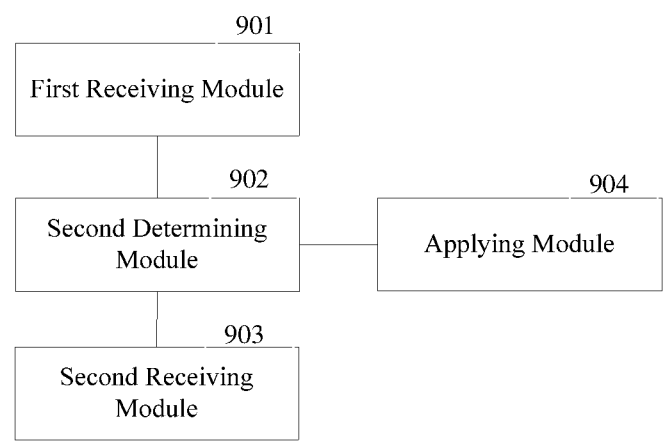
FIG. 9 is a structural block diagram of another terminal according to an embodiment of the present disclosure.

As shown in FIG. 9, according to another aspect of an embodiment of the present disclosure, a terminal for performing a CSI process is provided, including: a first receiving module 901 configured to receive N parameter sets of measurement and feedback configured by the base station through higher layer signaling. Each parameter set includes one or more of the M categories of the parameters for indicating measurement and feedback, where N is an integer greater than or equal to l and M is an integer greater than 1, the categories of the parameters include one or more of the following categories: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of the transmission pilot; a configuration parameter of a measurement limit parameter; a configuration parameter of a feedback dimension parameter; and a configuration parameter of a feedback mode parameter. The terminal further includes a second receiving module 903 configured to receive the selection information of the parameter set notified by the base station through physical layer signaling. The terminal further includes a second determining module 902 configured to determine a correspondence relationship between the selection information and one or more CSI Processes to be measured and fed back, and a correspondence relationship between the configured parameter set and each of the CSI processes. The terminal further includes an applying module 904 configured to apply the categories of parameters configured in the parameter set for the measurement and feedback of the corresponding CSI Process.

It should be noted that each module can be implemented by software or hardware. For the latter, it can be implemented in the following manner, but is not limited thereto: the above modules are all located in the same processor; or the above modules are respectively located in multiple processors.

An embodiment of the present disclosure also provides a computer-readable storage medium. Optionally, in the present embodiment, the above-mentioned computer-readable storage medium may be configured to store program codes for performing the following steps.

In step S1, a plurality of parameter sets are acquired, wherein the parameter set includes one or more categories of CSI parameters for indicating CSI measurement and/or feedback.

In step S2, a parameter set corresponding to the CSI process in the plurality of parameter sets is sent to the terminal.

Optionally, the computer-readable storage medium is further configured to store program codes for performing the following steps:

In step S3: a parameter set corresponding to the CSI process in the plurality of parameter sets is received from the base station, wherein each parameter set includes one or more categories of CSI parameters for indicating CSI measurement and/or feedback.

In step S4, CSI measurement and/or feedback is performed in the CSI process utilizing the one or more categories of CSI parameters configured in the parameter set corresponding to the CSI process.

Optionally, the computer-readable storage medium is further configured to store program codes for performing steps corresponding to other alternative embodiments of the base station side and the terminal side, and details are not described herein again.

Optionally, in this embodiment, the above computer-readable storage medium may include, but is not limited to, a variety of media that may store program codes, such as a U disk, a Read-Only Memory (ROM), a Random Access Memory (RAM), a mobile disk, a magnetic disk or an optical disk.

Optionally, in this embodiment, the processor executes the following steps according to the program codes stored in the computer-readable storage medium.

In step S1, a plurality of parameter sets are acquired, wherein the parameter set includes one or more categories of CSI parameters for indicating CSI measurement and/or feedback.

In step S2, a parameter set corresponding to the CSI process in the plurality of parameter sets is sent to the terminal.

Optionally, in this embodiment, the processor executes the following steps according to the program codes stored in the computer-readable storage medium.

In step S3: a parameter set corresponding to the CSI process in the plurality of parameter sets is received from the base station, wherein each parameter set includes one or more categories of CSI parameters for indicating CSI measurement and/or feedback.

In step S4, CSI measurement and/or feedback is performed in the CSI process utilizing the one or more categories of CSI parameters configured in the parameter set corresponding to the CSI process.

Optionally, in this embodiment, the processor executes steps according to program codes of steps corresponding to other optional implementations of a base station side and a terminal side stored in a computer-readable storage medium, and details are not described herein again.

Optionally, for specific examples in this embodiment, reference may be made to the examples described in the foregoing embodiments and optional implementations, which are not described herein again in this embodiment.

Those skilled in the art should understand that the above-mentioned modules or steps of the present application can be implemented using general-purpose computing devices, which can be concentrated on a single computing device or distributed on a network composed of a plurality of computing devices. Rather, they can be implemented with program codes that are executable by the computing device so that they can be stored in the storage device and executed by the computing device. In some cases, the steps can be performed in a different order from that illustrated or described herein, or they may be separately made into a single integrated circuit module, or a plurality of modules or steps are made into a single integrated circuit module. Thus, the present application is not limited to any specific combination of hardware and software.

The above are merely optional embodiments of the present application and are not intended to limit the present application. For those skilled in the art, the present application may have various alterations and modifications. Any modifications, equivalent substitutions, improvements etc. within the spirit and principles of this application shall be included in the scope of protection of this application.

INDUSTRIAL APPLICABILITY

Embodiments of the present application provides techniques for information notification and for performing a channel state information process, which can solve technical problems that standard transparent technologies cannot implement in the related art, and further achieve the effect of flexibly configuring CSI parameters to implement the standard transparent technology.

What is claimed is:

1. An information notification method comprising:
    determining, by a base station, M categories of parameters for indicating measurement and feedback, where M is an integer greater than or equal to 1, and the parameter categories contain at least one of: an indication parameter of a feedback class; an indication parameter of codebook selection; a configuration parameter of a channel measurement resource; a configuration parameter of a pilot multiplexing manner; configuration information of an interference measurement resource; a configuration parameter of a pilot binding parameter; a configuration parameter of a pilot power parameter; a configuration parameter of a frequency domain position of a transmission pilot; a configuration parameter of a measurement limit parameter; a configuration parameter of a feedback dimension parameter; and a configuration parameter of a feedback mode parameter; and
    performing, by the base station, joint encoding configuration for the M categories of parameters for indicating measurement and feedback, and configuring N parameter sets through higher layer signaling, where N is an integer greater than or equal to 1, and each of the parameter set at least contains a set of joint configuration parameters of the M categories of parameters for indicating measurement and feedback; and
    indicating simultaneously, by the base station, selection information of one or more configured parameter sets corresponding to triggering of one or more channel state information CSI processes when the base station triggers non-periodical CSI feedback through physical layer control signaling.

2. An information notification method comprising:
    acquiring a plurality of parameter sets, wherein each of the parameter sets comprises one or more categories of CSI parameters for indicating CSI measurement and/or feedback, and wherein the CSI parameter comprises at least one of: an indication parameter of a feedback class, an indication parameter of codebook selection, a configuration parameter of a channel measurement resource, a configuration parameter of a pilot multiplexing manner, configuration information of an interference measurement resource, a configuration parameter of a pilot binding parameter, a configuration parameter of a pilot power parameter, a configuration parameter of a frequency domain position of the transmission pilot, a configuration parameter of a measurement limit parameter, a configuration parameter of a feedback dimension parameter and a configuration parameter of a feedback mode parameter; and
    sending to a terminal a parameter set corresponding to the CSI process in the plurality of parameter sets.

3. The method according to claim 2, wherein sending to a terminal a parameter set corresponding to the CSI process in the plurality of parameter sets comprises:
    sending to a terminal a parameter set corresponding to the CSI process in the plurality of parameter sets through control signaling.

4. The method according to claim 2, wherein sending to a terminal a parameter set corresponding to the CSI process in the plurality of parameter sets comprises:
    when triggering a CSI process non-periodically, sending to the terminal a parameter set corresponding to the non-periodically triggered CSI process in the plurality of parameter sets.

5. The method according to claim 4, wherein triggering the CSI process non-periodically is performed by:
    triggering the CSI process non-periodically through physical layer control signaling.

6. The method according to claim 2, wherein the CSI parameter also comprises: a triggering indication parameter of a CSI process and/or a CSI triggering indication parameter of a serving cell.

7. The method according to claim 2, further comprising: triggering joint encoding configuration of each of the plurality of parameter sets by:
    performing joint encoding configuration according to triggering indications of the plurality of parameter sets and a CSI process set;
    performing joint encoding configuration according to CSI triggering indications of the plurality of parameter sets and a serving cell set; and
    performing joint encoding configuration according to CSI triggering indications of the plurality of parameter sets, the serving cell set and the CSI process set.

8. A base station for sending a notification to a terminal, comprising:
    an acquiring unit configured to acquire a plurality of parameter sets, wherein each of the parameter sets comprises one or more categories of CSI parameters for indicating CSI measurement and/or feedback, and wherein the CSI parameter comprises at least one of: an indication parameter of a feedback class, an indication parameter of codebook selection, a configuration parameter of a channel measurement resource, a configuration parameter of a pilot multiplexing manner, configuration information of an interference measurement resource, a configuration parameter of a pilot binding parameter, a configuration parameter of a pilot power parameter, a configuration parameter of a frequency domain position of the transmission pilot, a configuration parameter of a measurement limit parameter, a configuration parameter of a feedback dimension parameter and a configuration parameter of a feedback mode parameter; and
    a sending unit configured to send to a terminal a parameter set corresponding to the CSI process in the plurality of parameter sets.

9. The base station according to claim 8, wherein the sending unit is further configured to send to a terminal a parameter set corresponding to the CSI process in the plurality of parameter sets through control signaling.

10. The base station according to claim 8, wherein the sending unit is further configured to, when triggering a CSI process non-periodically, send to the terminal a parameter set corresponding to the non-periodically triggered CSI process in the plurality of parameter sets.

11. The base station according to claim 10, further comprising: a first triggering unit configured to trigger the CSI process non-periodically through physical layer control signaling.

12. The base station according to claim 8, further comprising: a second triggering unit configured to trigger joint encoding configuration of each of the plurality of parameter sets by:
    performing joint encoding configuration according to triggering indications of the plurality of parameter sets and a CSI process set;

performing joint encoding configuration according to CSI triggering indications of the plurality of parameter sets and a serving cell set; and performing joint encoding configuration according to CSI triggering indications of the plurality of parameter sets, the serving cell set and the CSI process set.

13. The method according to claim 2, wherein the CSI parameter also comprises: a triggering indication parameter of a CSI process and/or a CSI triggering indication parameter of a serving cell.

* * * * *